Dec. 8, 1953
T C. NOON ET AL
2,661,756
FLOW CONTROL APPARATUS
Filed April 5, 1951
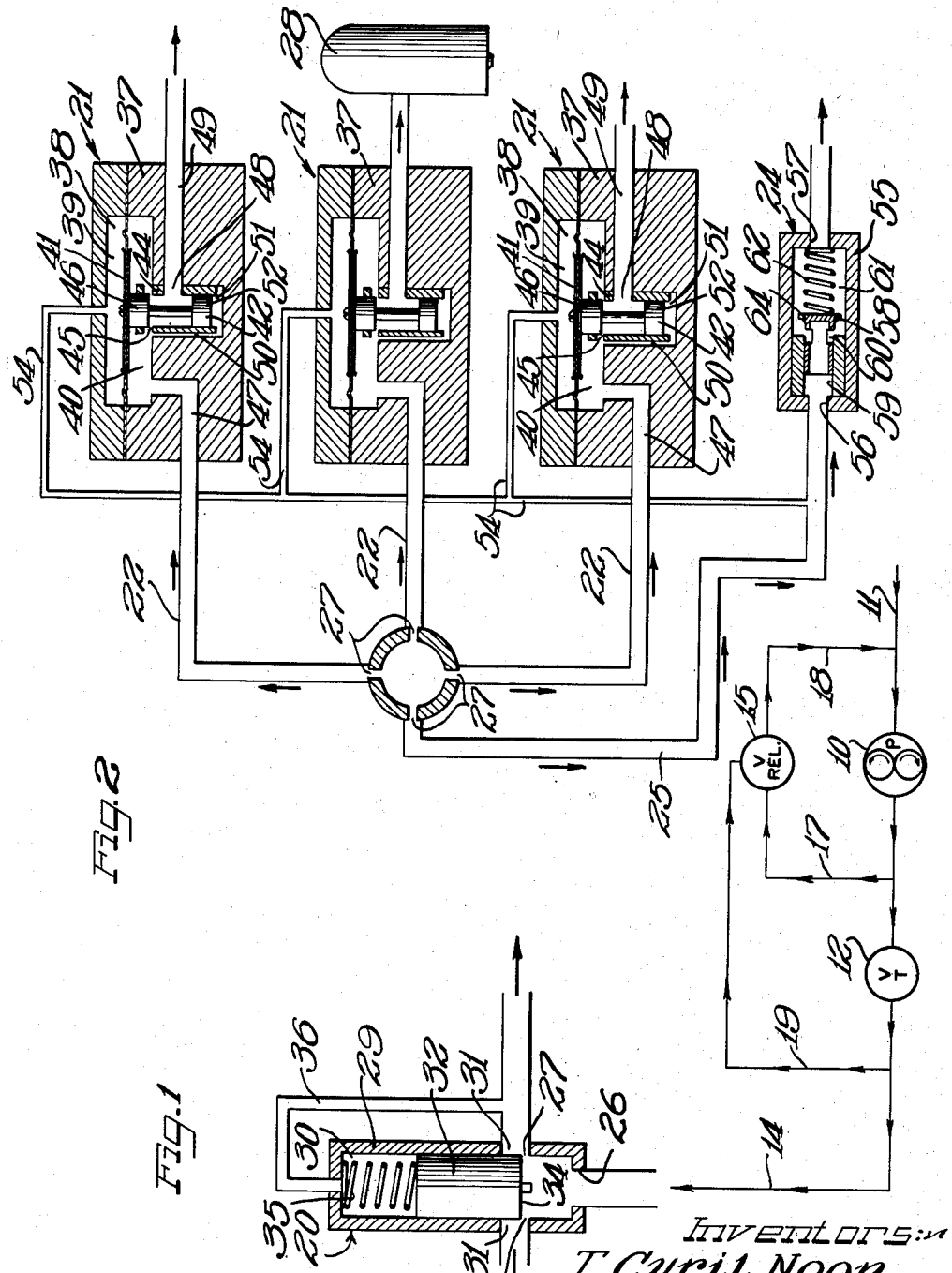
Inventors:
T Cyril Noon
Frank C. Bayer
by [signature] Attys Patented Dec. 8, 1953

2,661,756

UNITED STATES PATENT OFFICE 2,661,756

FLOW CONTROL APPARATUS

T Cyril Noon, Bainbridge Township, Geauga County, and Frank C. Bayer, Euclid, Ohio, assignors to Thompson Products, Inc., Cleveland, Ohio, a corporation of Ohio Application April 5, 1951, Serial No. 219,362

8 Claims. (Cl. 137—118)

The present invention relates to improvements in fluid flow control apparatus for maintaining proportional flows in a plurality of passages in a wide range of total flow.

Flow control systems have heretofore been devised for proportionally metering fluid flow through a plurality of passages by maintaining equal pressure drops across proportionally matched fixed metering orifices in the respective passages. However, the utilization of fixed area metering orifices unduly limits the range of fluid flow possible with a single phase system since the pressure drop across a fixed orifice increases with the square of the fluid flow through the orifice.

It is an object of the present invention to provide an improved flow system for accurately proportioning flow through a plurality of passages over a wide range of total flow.

Another object of the invention is to provide a flow control system including simplified means for varying the effective areas of a plurality of metering orifices while maintaining a predetermined proportional relation between the areas of the orifices.

A further object of the invention is to provide an improved fluid flow control system for accurately metering the flow through a plurality of passages over a wide range of total flow by maintaining equal pressure drops across a plurality of variable area metering orifices.

Still another object of the present invention is to provide a fluid flow control system including a multiple orifice valve for accurately maintaining a proportional relation between the variable areas of a plurality of metering orifices.

A still further object of the invention is to provide a multiple orifice valve in a flow control system for varying the areas of a plurality of orifices in a predetermined proportional relation in accordance with changes in pressure drop across the valve.

Other objects, features and advantages of the present invention will be apparent from the following detailed description of one preferred embodiment, by way of example only, taken in conjunction with the accompanying drawings, in which:

Figure 1 is a schematic, partially sectional view of the first portion of the flow system according to the present invention, including a pressurized fluid source and a multiple orifice valve; and Figure 2 is a schematic, partially sectional view of the second portion of the flow system, including the multiple orifice valve, pilot and slave valves, and discharge nozzles.

The flow control system of the present invention substantially increases the total fluid flow range by providing variable area metering orifices in a multiple orifice valve which may be very easily produced and will accurately proportionally vary the areas of the metering orifices in response to changing fluid pressure. The system utilizes a plurality of diaphragm-controlled variable effective area slave valves in a plurality of slave passages and a spring-loaded, pressure-actuated pilot valve in a pilot passage. The pressures upstream of the slave valves are maintained equal to the pressure upstream of the pilot valve by referencing the upstream pilot valve pressure or control pressure to one side of each of the diaphragms to bias the slave valves toward closing position while the pressures in the slave passages upstream of the slave valves are referenced against the other sides of the diaphragms to urge the slave valves toward open positions.

Fluid from a pressurized source enters the multiple orifice valve and is metered to the various passages by the respective proportionally matched metering orifices. A plunger in the orifice valve progressively covers and uncovers the orifices in response to changing fluid pressure to vary the areas of the metering orifices in a predetermined proportional relation. A compression spring urges the plunger in an orifice closing direction while the fluid inlet pressure urges the plunger in an orifice opening direction. The pressure downstream of one of the orifices, which is the same as the pressure downstream of each of the other orifices, is referenced to the spring-biased end of the plunger to augment the bias of the spring in urging the plunger toward orifice closing position.

Thus, the multiple valve serves to proportionally increase the flow areas of the variable orifices therein in response to an increase in pressure drop across the orifices. As a result, the pressure drop across the metering orifices will increase relatively slowly with increasing flow so that the total flow range of the system is greatly increased without requiring an extremely high fluid inlet pressure. Furthermore, the increased flow range is achieved without the necessity for utilizing bypass or dual system means, and the proportional relation between the flows is accurately maintained with very little complication over the simplest form of fixed area metering orifice systems.

In the flow system of this invention, as shown in the figures, fluid, such as gas turbine fuel, is pumped from a tank (not shown) by means of a pump such as the gear pump 10 through a line 11 and through a fluid flow control or throttle valve 12 to a fluid supply line 14. In order to prevent excessive pressure from being transmitted to the flow system, a pressure relief valve 15 is connected across the gear pump 10 by means of lines 17 and 18 and across the gear pump 10 and the throttle valve 12 by means of a line 19 and the line 18.

According to this invention, means are provided for accurately metering flow through a plurality of passages over a wide range of total flow. Herein, such means comprise a multiple orifice valve 20, a plurality of pressure-actuated variable effective area slave valves 21 located in slave passages 22, and a pressure-actuated variable effective area pilot valve 24 located in a pilot passage 25. The multiple orifice valve 20 is connected to the supply line 14 at an inlet port 26. From here, the fluid passes through the orifice valve 20 and out a plurality of variable area metering orifices 27 which connect the multiple orifice valve with the respective slave passages 22 and the pilot passage 25. The pressures in the passages 22 and 25 between the orifice valve 20 and the slave and pilot valves 21 and 24 are maintained equal by action of these pressure-responsive slave and pilot valves. When the system is used for controlling fluid fuel flow in a gas turbine engine (not shown), the pilot and slave passages 22 and 25 are connected to suitable respective discharge nozzles 28 down-stream of the valves 21 and 24 for directing fluid fuel in conical spray patterns into the combustion chambers or cans (not shown) of the engine.

The multiple orifice valve 20 is constructed to accurately maintain a predetermined proportional relation between the areas of the variable orifices 27 over the entire range of change in the area. The orifice valve 20 is of a simple and efficient construction comprising a cylindrical casing 29 having an axial cylindrical bore 30 therein with the inlet port 26 at the upstream end of the bore and a plurality of radial ports 31 communicating through the casing 29 in a circumferential series with the bore 30. The ports 31 are herein preferably formed as slots with the opposite axial extremities of the series of ports defined in two parallel diametrical planes. A piston or plunger 32 is slidably disposed in peripheral conforming relation within the bore 30 and has a flat end portion 34 formed in a diametrical plane. The plunger 32, with its flat end portion 34, coacts with the ports 31 to form the variable area orifices 27 through the uncovered portions of the ports.

The areas of the variable orifices 27 are maintained in a predetermined proportional relation as the plunger 32 moves in axially progressively as the plunger 32 moves in an orifice closing or an orifice opening direction. Thus, in any position of the plunger 32, the same predetermined proportional area relation is maintained between the variable orifices 27, and since the pressures upstream and downstream of the orifices are maintained respectively equal, the flow through each of the variable orifices 27 will remain in exact proportion to the flow through each of the other orifices.

Means are provided for rendering the action of the plunger 32, in varying the area of the variable orifices 27, responsive to the pressure drop across the orifices so that the orifice areas will increase with increasing pressure drop to allow for greater flow through the system without necessitating extremely high upstream pressures. In the present instance, such means comprise a coil compression spring 35 disposed between the plunger 32 and the end of the casing 29 opposite to the end containing the inlet port 26, and a feed-back reference pressure line 36 connected between one of the slave or pilot passages 22 or 25 and the portion of the bore 30. Thus, the pressure downstream of the variable area orifices 27 augments the bias of the compression spring 35 to urge the plunger 32 in an orifice closing direction. Since the fluid inlet pressure acts against the plunger end surface 34 to urge the plunger in an orifice opening direction, the plunger 32 will move in an orifice opening direction to increase the area of the variable orifices 27 in response to an increasing pressure drop across the variable area orifices.

Therefore, the increase in pressure drop across the multiple orifice valve 20 will be fairly slow with increasing flow therethrough, since the areas of the orifices 27 increase as the pressure drop increases. This will be readily understood since the flow across an orifice increases directly with an increase in area when the same pressure drop and upstream pressure are maintained so that the ordinary rapid increase in pressure drop across the orifice with increase in flow therethrough is to a great extent compensated for by an increase in area of the orifice.

In order to maintain the pressure in the slave passages 22 equal to the control pressure in the pilot passage 25, each of the slave valves 21 comprises a casing 37 with a cylindrical chamber 38 formed therein. The chamber 38 is separated into a static pressure chamber 39 and a flow chamber 40 by means of a flexible diaphragm 41 which is fixedly clamped about its outer peripheral edges by portions of the casing 37. A valve plunger or piston 42 is fixedly attached at one end portion to the central portion of the diaphragm 41 and is slidably disposed in a valve sleeve 44 which, in turn, is fixedly disposed in the valve casing 37. A variable area valve aperture 45 is provided between a radially enlarged portion 46 of the piston 42 and the upstream open end of the sleeve 44. The slave passage 22 communicates upstream with the flow chamber 40 through an internal passage 47. Downstream of the variable area aperture 45 the slave passage 22 is defined by the interior of the sleeve 44 and a radial aperture 48 through the side wall thereof which registers with an internal passage 49 to lead out of the slave valve 21.

In order to pressure balance the valve piston 42, an axial reference passage 50 communicates between the flow chamber 40 and a balance chamber 51 to direct the fluid pressure against a second radially enlarged portion 52 of the valve piston at the end opposite to the diaphragm 41.

The fluid pressure in the pilot passage 25 upstream of the pilot valve 24 is referenced to each of the static pressure chambers 39 in the slave valves 21 by means of reference lines 54. Since the diaphragms 41 are flexible, the valve piston 42 will be moved in accordance with the pressure differentials across the diaphragms in order to increase or decrease the pressure within the flow chambers 40 in accordance with increases or decreases in the pressures within the static pressure chambers 39. Therefore, the pressures in all of the flow chambers 40 will be maintained equal to those in the static pressure chambers 39 which, in turn, are equal to the control pressure in the pilot passage 25 upstream of the pilot valve 24. Hence, the pressures in the slave passages 22 and in the pilot passages 25 are maintained equal.

It will be seen that as long as the pressure requirement of the variable area nozzle 28 in the pilot passage 25 is greater than the pressure requirements of any of the nozzles 28 located in the slave passages 22, the flow control system will operate satisfactorily. However, if one of the slave variable area nozzles should require a greater pressure than that required by the pilot variable area nozzle, the flow in the slave passage having the nozzle with the higher pressure requirement will fall below that in the pilot passage. In order to alleviate this detrimental effect and to insure that the flows in all of the passages will be maintained equal, regardless of variations in variable area nozzle pressure requirements, the pilot valve 24 is provided to impart an additional predetermined pressure drop in the pilot passage 25.

The pilot valve 24 comprises a casing 55 having an inlet port 56 at the upstream end and an outlet port 57 at the downstream end. A valve sleeve member 58 is slidably disposed in peripheral conforming relation within a reduced diameter bore 59 near the upstream end of the casing. The valve sleeve member 58 has a plurality of radial apertures 60 which are adapted to permit fluid to pass through the pilot valve when the valve member is biased, by inlet fluid pressure, in a downstream direction so that the apertures 60 communicate with an enlarged diameter spring chamber 61. For biasing the valve sleeve member 58 into aperture closing position, a coil compression spring 62 is disposed in the spring chamber 61 between the downstream end of the casing 55 and a valve seat head portion 64 formed at the downstream end of the sleeve 58. When the valve member 58 is biased by the spring 62 so that the valve seat head 64 abuts the portion of the casing defining the downstream end of the reduced diameter bore 59, the flow through the pilot valve 24 is cut off.

It will be evident that a pressure drop is induced in the pilot valve 24 when the fluid flows therethrough due to the action of the spring 62 and the relation of the apertures 60 to the general flow path. The pressure drop induced by the pilot valve 24 is of a predetermined amount to compensate for expected maximum variations in all of the nozzle pressure requirements. Therefore, this system is of the "predicted error compensation" type which will maintain equal flows through all of the passages regardless of variations in variable area nozzle pressure requirements within a predicted range.

It will be readily apparent from the above description that the present invention provides an improved and simplified fluid flow control system for accurately proportionally metering fluid flow through a plurality of passages over a wide range of total flow. Efficient and accurately performing variable orifice means are provided for changing the areas of the metering orifices while still maintaining a predetermined area relation between the orifices. Pressure equalizing means are provided which are particularly adapted for use in this type of flow control system. The overall result of the several improvements included in this system is the achievement of accurate proportional metering in a plurality of passages over a wide range of total fluid flow in a simplified flow control apparatus.

It will be understood that modifications and variations may be effected without departing from the scope of the novel concepts of the present invention.

We claim as our invention:

1. Flow control apparatus for maintaining proportional flows through at least three passages from a common pressurized fluid source, comprising an orifice valve fluid connected to said pressure source and having pressure actuated means therein defining at least three variable area metering orifices opening downstream into said passages, respectively, said means maintaining a predetermined proportional relation between the flow areas of said metering orifices regardless of the fluid pressure bias actuating said means to open said orifices, and pressure-actuated mechanism in certain of said passages downstream of said orifice valve, another of said passages serving as a pilot passage, said pressure-actuated mechanisms each including a flexible diaphragm, devices each defining a variable area aperture in one of said certain passages and operatively associated with one of said diaphragms, fluid pressure in said certain passages upstream of said variable area apertures acting on one side of each of said diaphragms to open said apertures, and means referencing fluid pressure in said pilot passage to the other side of each of said diaphragms to close said apertures for maintaining equal pressures in the passages between the orifice valve and said mechanisms.

2. Flow control apparatus for maintaining proportional flows through a plurality of passages from a common pressurized fluid source, comprising an orifice valve fluid connected to said pressure source and having pressure-actuated means therein defining a plurality of variable area metering orifices opening downstream into said passages, respectively, said means maintaining a predetermined proportional relation between the flow areas of said metering orifices regardless of the fluid pressure bias actuating said means to open said orifices, a pressure-actuated variable area pilot valve in one of said passages downstream of said orifice valve, a flexible diaphragm associated with each of said passages except said one, mechanism defining a variable area aperture positively associated with each of said diaphragms in each of said passages except said one, fluid pressure in said passages upstream of said mechanisms acting on one side of each of said diaphragms to open said apertures, and means referencing the fluid pressure in said one passage between said orifice valve and said pilot valve to the other side of each of said diaphragms to close said apertures.

3. A flow control system for accurately proportioning fluid flow through at least three passages from a common pressurized source, comprising an orifice valve fluid-connected to said pressurized source and having an axial bore therein with at least three radial metering orifices communicating therewith, said orifices metering flow from said pressurized source to the respective passages, a plunger reciprocably mounted in said bore for varying the effective area of said orifices in a predetermined proportional relation with fluid pressure upstream of the orifice urging the plunger toward orifice opening position, means biasing said plunger toward orifice closing position, and pressure-actuated mechanism in certain of said passages downstream of said orifice valve, another of said passages serving as a pilot passage, said pressure-actuated mechanisms each including a flexible diaphragm, devices each defining a variable area aperture in one of said certain passages and operatively associated with one of said diaphragms, fluid pressure in said certain passages upstream of said variable area apertures acting on one side of each of said diaphragms to open said apertures, and means referencing fluid pressure in said pilot passage to the other side of each of said diaphragms to close said apertures for maintaining equal pressures in the passages between the orifice valve and said mechanisms.

4. A flow control system for accurately proportioning fluid flow through a plurality of passages from a common pressurized source, comprising an orifice valve fluid-connected to said pressurized source and having an axial bore therein with a plurality of radial metering orifices communicating therewith, said orifices metering flow from said pressurized source to the respective passages, a plunger reciprocably mounted in said bore for varying the effective area of said orifices in a predetermined proportional relation with fluid pressure upstream of the orifices urging the plunger toward orifice opening position, means biasing said plunger toward orifice closing position, a pressure-actuated variable area pilot valve in one of said passages downstream of said orifice valve, a flexible diaphragm associated with each of said passages except said one, mechanism defining a variable area aperture operatively associated with said diaphragm in each of said passages except said one, fluid pressure in said passages upstream of said mechanisms acting on one side of each of said diaphragms to open said apertures, and means referencing the fluid pressure in said one passage between said orifice valve and said pilot valve to the other side of said diaphragms to close said apertures.

5. In a flow control system for proportionally metering fluid flow through at least three passages from a common pressurized source, an orifice valve comprising a casing having an axial bore with at least three radial metering orifices communicating therewith, said orifices having their areas arranged for maintaining a predetermined proportional relation axially progressively, a plunger reciprocably mounted in peripheral conforming relation within said bore for progressively covering and uncovering said orifices, fluid pressure from said source acting on one end of said plunger to urge the same in an orifice opening direction, spring means biasing said plunger in orifice closing direction, and means for referencing the pressure downstream of one of said orifices against the other end of said plunger to augment the bias of said spring means.

6. A fluid flow control system for maintaining proportional flows in a plurality of slave passages and a pilot passage all from a common pressurized source, said system comprising a metering mechanism including a diaphragm-controlled variable effective area slave valve in each slave passage controlling flow therethrough, a pressure-actuated variable effective area pilot valve controlling flow in said pilot passage, fluid passages referencing the fluid pressure upstream of said pilot valve against one side of each of said diaphragms to urge said slave valves toward closed position, fluid pressure in said slave passages upstream of said slave valves referenced against the other sides of said diaphragms to urge said slave valves toward open positions, an orifice valve fluid connected to said pressurized source upstream of said pilot and slave passages and having an axial bore therein with a plurality of radial metering orifices communicating therewith, said orifices opening downstream into the respective pilot and slave passages for metering flow thereto from said pressurized source, a plunger reciprocably mounted in said bore for varying the effective area of said orifices in a predetermined proportional relation with fluid pressure upstream of the orifices urging the plunger toward orifice opening position, and means biasing said plunger toward orifice closing position.

7. A fluid flow control system for maintaining proportional flows in a plurality of slave passages and a pilot passage all from a common pressurized source, said system comprising an orifice valve including a casing having a cylindrical bore with a plurality of radially directed orifices communicating with said bore through said casing, said orifices having their opposite axial extremities defined in two diametrical planes and having their areas arranged in predetermined proportional relation axially progressively, a plunger reciprocably disposed in peripheral conformed relation in said bore and having an end face formed in a diametrical plane, said casing having a fluid inlet port at one end of said bore opposing said plunger face, a compression spring abutting the opposite end of said plunger to urge the same in an orifice closing direction, a fluid passage referencing the fluid pressure downstream of one of said orifices to said opposite end of said plunger, said orifices opening downstream into the respective pilot and slave passages, metering mechanism in each of said slave passages including a diaphragm-controlled variable effective area slave valve for controlling flow therethrough, a pressure-actuated variable effective area pilot valve controlling flow in said pilot passage, fluid passages referencing the fluid pressure upstream of said pilot valve against one side of each of said diaphragms to urge said slave valves toward closed positions, fluid pressure in said slave passages upstream of said slave valves referenced against the other sides of said diaphragms to urge said slave valves toward open positions.

8. Flow control apparatus for maintaining proportional flows through at least three passages from a common pressurized fluid source, comprising an orifice valve fluid connected to said pressure source and having pressure actuated means therein defining at least three variable area metering orifices opening downstream into said passages, respectively, said pressure actuated means maintaining a predetermined proportional relation between the flow areas of said metering orifices regardless of the fluid pressure bias actuating said means to open said orifices, one of said passages serving as a pilot passage, flow control means in at least two other of said passages downstream of said orifice valve, said flow control means including devices each defining a variable area aperture in one of said other passages, respectively, and including pressure responsive means each operatively connected with one of said devices and actuated by fluid pressure in said respective other passages upstream of said variable area apertures to actuate said devices to open said apertures, means referencing fluid pressure in said pilot passage to each of said pressure responsive means, said pressure responsive means being actuated by fluid pressure in said pilot passage to actuate said devices to close said apertures.

T CYRIL NOON.
     FRANK C. BAYER.

References Cited in the file of this patent

UNITED STATES PATENTS

| Number | Name | Date |
|---|---|---|
| 2,310,984 | Mock et al. | Feb. 16, 1943 |
| 2,365,095 | Miller et al. | Dec. 12, 1944 |

FOREIGN PATENTS

| Number | Country | Date |
|---|---|---|
| 577,132 | Great Britain | May 7, 1946 |